United States Patent
Pandharipande (10) Patent No.: US 10,462,625 B2
(45) Date of Patent: Oct. 29, 2019

(54) TIME-MULTIPLEX TRANSMISSION OF LOCALISATION BEACON SIGNALS AND CONTROL-RELATED SIGNALS

(71) Applicant: SIGNIFY HOLDING B.V., Eindhoven (NL)

(72) Inventor: Ashish Vijay Pandharipande, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/553,312

(22) PCT Filed: Feb. 11, 2016

(86) PCT No.: PCT/EP2016/052908
§ 371 (c)(1),
(2) Date: Aug. 24, 2017

(87) PCT Pub. No.: WO2016/134976
PCT Pub. Date: Sep. 1, 2016

(65) Prior Publication Data
US 2018/0249306 A1 Aug. 30, 2018

(30) Foreign Application Priority Data
Feb. 24, 2015 (EP) .................................. 15156328

(51) Int. Cl.
*H04W 4/33* (2018.01)
*H04Q 9/00* (2006.01)
(Continued)

(52) U.S. Cl.
CPC .............. *H04W 4/33* (2018.02); *G01S 1/042* (2013.01); *G01S 1/68* (2013.01); *H04Q 9/00* (2013.01); *H04W 64/00* (2013.01); *H05B 37/0227* (2013.01); *H05B 37/0272* (2013.01)

(58) Field of Classification Search
CPC ............. H04W 4/33; G01S 1/042; G01S 1/68
See application file for complete search history.

(56) References Cited

U.S. PATENT DOCUMENTS

2012/0027110 A1* 2/2012 Han .................... H04J 11/0079
375/260
2012/0165041 A1* 6/2012 Jang ......................... G01S 1/68
455/456.1
(Continued)

FOREIGN PATENT DOCUMENTS

CN 103619090 A 3/2014
WO 9950968 A1 10/1999
(Continued)

OTHER PUBLICATIONS

Meenakshi B., et al., "Cluster Based Time Divisiion Multiple Access Scheduling Scheme for Zigbee Wireless Sensor Networks," Journal of Computer Science 2012, 8 (12) (8 Pages).
(Continued)

*Primary Examiner* — Ernest G Tacsik
(74) *Attorney, Agent, or Firm* — Meenakshy Chakravorty (57) ABSTRACT

A localization system comprising a plurality of wireless reference nodes for detecting a location of a mobile device within an environment. Each node transmits localization beacon signals to be detected by the mobile device, and/or listens for localization beacon signals from the mobile device. Further, the system also provides or contributes to providing another utility into the environment (e.g. each node being a luminaire); and transmits and/or listens for control-related signals, other than localization beacon signals, related to controlling the provision of said utility, the control related signals being communicated on a same or overlapping frequency band as the localization beacon signals, one or more controllers are configured to control the transmission of and/or listening for the control-related sig-
(Continued)

nals to be time-multiplexed into different time slots than the transmission and/or listening for the localization beacon signals, between the time-slots of the control-related signals.

16 Claims, 3 Drawing Sheets

(51) Int. Cl.
*H04W 64/00* (2009.01)
*G01S 1/04* (2006.01)
*G01S 1/68* (2006.01)
*H05B 37/02* (2006.01)

(56) References Cited

U.S. PATENT DOCUMENTS

| | | | | |
|---|---|---|---|---|
| 2012/0235579 A1* | 9/2012 | Chemel | ............ | F21S 2/005 315/152 |
| 2014/0056286 A1 | 2/2014 | Nagata | | |
| 2014/0167956 A1 | 6/2014 | Chu | | |
| 2014/0320318 A1* | 10/2014 | Victor | ............ | G08G 1/142 340/932.2 |
| 2017/0055334 A1 | 2/2017 | Pandharipande et al. | | |

FOREIGN PATENT DOCUMENTS

| | | |
|---|---|---|
| WO | 2007072285 A1 | 6/2007 |
| WO | 2009129232 A1 | 10/2009 |
| WO | 2014083494 A2 | 6/2014 |

OTHER PUBLICATIONS

Berger, Achim, et al., "TDMA Approach for Efficient Data Collection in Wireless Sensor Networks," Proceedings of the 2011 IEEE International Conference on Mechatronics, 2011 (6 Pages).

Liu, Hui, et al., "Survey of Wireless Indoor Positioning Techniques and Systems," IEEE Transactions on Systems, Man, and Cybernetics—Part C: Applications and Reviews, vol. 37, No. 6, 2007 (14 Pages).

* cited by examiner

TIME-MULTIPLEX TRANSMISSION OF LOCALISATION BEACON SIGNALS AND CONTROL-RELATED SIGNALS

CROSS-REFERENCE TO PRIOR APPLICATIONS

This application is the U.S. National Phase application under 35 U.S.C. § 371 of International Application No. PCT/EP2016/052908, filed on Feb. 11, 2016, which claims the benefit of European Patent Application No. 15156328.5, filed on Feb. 24, 2015. These applications are hereby incorporated by reference herein.

TECHNICAL FIELD

The present disclosure relates to localization, i.e. the process of determining the location of a mobile device based on a network of wireless nodes.

BACKGROUND

In a localization system such as an indoor positioning system, the location of a wireless device such as a mobile user terminal can be determined with respect to a location network comprising a plurality of wireless reference nodes, in some cases also referred to as anchor nodes. These anchors are wireless nodes whose locations are known a priori, typically being recorded in a location database which can be queried to look up the location of a node. The anchor nodes thus act as reference nodes for localization. Measurements are taken of the signals transmitted between the mobile device and a plurality of anchor nodes, for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration or triangulation. Given the relative location of the mobile terminal and the known locations of the anchor nodes, this in turn allows the location of the mobile device to be determined in more absolute terms, e.g. relative to the globe or a map or floorplan.

Another localization technique is to determine the location of mobile device based on a "fingerprint" of a known environment. The fingerprint comprises a set of data points each corresponding to a respective one of a plurality of locations throughout the environment in question. Each data point is generated during a training phase by placing a wireless device at the respective location, taking a measurement of the signals received from or by any reference nodes within range at the respective location (e.g. a measure of signal strength such as RSSI), and storing these measurements in a location server along with the coordinates of the respective location. The data point is stored along with other such data points in order to build up a fingerprint of the signal measurements as experienced at various locations within the environment. Once deployed, the signal measurements stored in the fingerprint can then be compared with signal measurements currently experienced by a mobile device whose location is desired to be known, in order to estimate the location of the mobile device relative to the corresponding coordinates of the points in the fingerprint. For example this may be done by approximating that the device is located at the coordinates of the data point having the closest matching signal measurements, or by interpolating between the coordinates of a subset of the data points having signal measurements most closely matching those currently experienced by the device. The fingerprint can be pre-trained in a dedicated training phase before the fingerprint is deployed by systematically placing a test device at various different locations in the environment. Alternatively or additionally, the fingerprint can built up dynamically by receiving submissions of signal measurements experienced by the actual devices of actual users in an ongoing training phase.

The determination of the mobile device's location may be performed according to a "device-centric" approach or a "network-centric" approach. According to a device centric approach, each anchor or reference node emits a respective beacon signal. The mobile device takes measurements of beacon signals it receives from the reference nodes, obtains the locations of those nodes from the location server, and performs the calculation to determine its own location at the mobile device itself. According to a network-centric approach on the other hand, the reference nodes are used to take measurements of beacon signals received from the mobile device, and an element of the network such as the location server performs the calculation to determine the mobile device's location. Hybrid approaches are also possible, e.g. where the mobile device takes the raw measurements but forwards them to the location server to calculate its location.

There are various reasons why it may be desirable to be able to detect the location of a wireless device, such as to provide location based services. For instance, one application of a positioning system is to automatically provide a wireless mobile device with access to control of a utility such as a lighting system, on condition that the mobile device is found to be located in a particular spatial region or zone associated with the lighting or other utility. E.g. access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-based advertising, service alerts or provision of other location-related information, user tracking, asset tracking, or taking payment of road tolls or other location dependent payments.

It is also known to incorporate the beaconing functionality of an anchor node into another unit that is designed to provide another utility such as lighting into the environment in question, rather than the anchor node being a separate, dedicated, stand-alone unit. Consider for example a smart lighting system with wireless lighting control and radio-based indoor positioning. Here each node of the positioning system is also a luminaire for illuminating the environment. The wireless lighting control system adapts to occupancy and daylight changes based on sensor measurements, with the sensor and control-related messages transmitted wirelessly.

SUMMARY

In such a system however, beacon transmissions used for indoor positioning may cause harmful interference to the control transmissions, leading to higher packet losses. This has the adverse result of degrading the illumination performance of the lighting system, for instance by slowing the adaptivity of the system to occupancy and/or daylight changes. In the present disclosure, there is provided an interference-aware beaconing solution so that the beacon transmissions are scheduled in a way that the wireless lighting control system may coexist amicably with the RF positioning system.

Similar considerations may also apply in other types of localization system, e.g. where the location beaconing functionality is incorporated into other, alternative or additional types of unit, not just luminaires. For example, the wireless reference nodes may take the form of luminaires, smoke alarms, presence sensor units, light sensor units (e.g. ambient light sensors), security alarms, air-conditioning units, ventilation units, heating units, or any combination of these and/or others; and it would be desirable that the location beaconing signals did not interfere with control-related signals being communicated wirelessly for the purpose of controlling the utility in question.

According to one aspect disclosed herein, there is provided a localization system for detecting a location of a mobile device within an environment. The localization system comprises a plurality of wireless reference nodes, each of which is arranged to transmit localization beacon signals to be detected by the mobile device, and/or to listen for localization beacon signals from the mobile device. The system also comprises one or more appliances arranged to provide or contribute to providing another utility into the environment, other than localization of mobile devices (e.g. a respective appliance, such as a lamp for providing illumination, being incorporated into each of the reference nodes). Further, the system comprises one or more controllers arranged to control the one or more appliances, and to use a wireless interface of each of the appliances to transmit and/or listen for control-related signals, other than localization beacon signals, related to controlling the provision of said utility. The controller(s) may take the form of a local controller in each of the nodes, and/or a centralized controller. The control-related signals are communicated on a same or overlapping frequency band as the localization beacon signals (e.g. some or all of the control-related signals may be communicated using a same one of said one or more wireless interfaces as some or all of the localization beacon signals). To accommodate this, the wireless reference nodes are configured to ensure the transmission of and/or listening for the localization beacon signals is time-multiplexed into different time slots than the transmission of and/or listening for said control-related signals, between the time slots of the control-related signals.

Thus for example, the transmission of location beaconing signals from the node will not interfere with control-related signals being listened for from elsewhere, e.g. from a centralized controller of the utility and/or from others of the nodes.

In embodiments, a respective one of said appliances co-located with (e.g. incorporated in the same unit as) each of one, some or all of the wireless reference nodes (e.g. each node being both a luminaire and an anchor node). The one or more controllers may also comprise a respective one of the controllers located at each of the wireless reference nodes. In such cases, the wireless interface of the appliance may be the same wireless interface used for the beaconing, or may be a separate interface.

In embodiments, the localization system may comprise a location server configured to compute the location of the mobile device using measurements of at least some of said localization beacon signals reported to the location server. The measurements may be reported to the localization server from a plurality of the wireless reference nodes (network centric approach) or from the mobile device (hybrid approach).

In embodiments, the localization system may comprise an application server configured to provide the mobile device with a location-based service based on the location of the mobile device as computed using at least some of the localization beacon signals (e.g. the mobile device is allowed to control the lighting in a room if detected to be present in that room, or may be provided with location related information such as advertising, local directions or maps, information on exhibits, etc.). Said computation of the location of the mobile device may be performed at the location server (network-centric or hybrid approaches) or at the mobile device (device-centric approach), and may be reported from there to the application server in order for the location-based service to be provided based on said location.

In embodiments, the one or more controllers may comprise a centralized controller of the utility, and said one or more of said control-related signals may comprise control commands being received from the centralized controller.

In embodiments, one or more of the wireless reference nodes may comprise a respective sensor (e.g. a presence sensor or a daylight sensor), and at least some of said control-related signals may comprise sensor data taken using the respective sensor and transmitted from at least one of sad one or more nodes (transmitted to the control unit and/or one or more others of said nodes).

In embodiments, the one or more controllers may comprise a respective one of the controllers located at each of the wireless reference nodes, and the one or more of the control-related signals listened for by the respective controller at at least one of the nodes may comprise sensor data being received from one or more others of said nodes.

In embodiments, each of one, some or all of the wireless reference nodes is configured to: detect one or more sensing events based on activity sensed using the sensor, transmit the sensor data in an allocated one of said time slots if one of the sensing events is detected, and transmit one of the localization beacon signals in said allocated time slot if none of the sensing events is detected.

According to another aspect disclosed herein, there is provided a computer program product for use in a localization system comprising a plurality of wireless reference nodes (6) for detecting a location of a mobile device within an environment, the computer program product comprising code embodied on a computer-readable medium and/or being downloadable therefrom and configured so as when run on one or more controllers to perform operations of: controlling each of the reference nodes to transmit localization beacon signals to be detected by the mobile device, and/or to listen for localization beacon signals from the mobile device; controlling one or more appliances to provide or contribute to providing another utility into the environment, other than localization of mobile devices; and controlling a wireless interface of each of the appliances to transmit and/or listen for control-related signals, other than localization beacon signals, related to controlling the provision of said utility, the control-related signals being communicated on a same or overlapping frequency band as the localization beacon signals; wherein the code is configured to ensure the transmission of and/or listening for the localization beacon signals is time-multiplexed into different time slots than the transmission of and/or listening for said control-related signals, between the time slots of the control-related signals.

In embodiments, the computer program product may be further configured to perform operations in accordance with any of the system features disclosed herein.

According to another aspect of the present disclosure, there is provided a method of operating a localization system comprising a plurality of wireless reference nodes (6) for detecting a location of a mobile device within an environment, the method comprising: controlling each of the wireless reference nodes to transmit localization beacon signals to be detected by the mobile device, and/or to listen for localization beacon signals from the mobile device; controlling one or more appliances to provide or contribute to providing another utility into the environment, other than localization of mobile devices; and controlling a wireless interface of each of the appliances to transmit and/or listen for control-related signals, other than localization beacon signals, related to controlling the provision of said utility, the control-related signals being communicated on a same or overlapping frequency band as the localization beacon signals; wherein the controlling of the wireless interface comprises ensuring that the transmission of and/or listening for the localization beacon signals is time-multiplexed into different time slots than the transmission of and/or listening for said control-related signals, between the time slots of the control-related signals.

In embodiments, the method may further comprise steps in accordance with any of the system features disclosed herein.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF PREFERRED EMBODIMENTS

Figure 1:
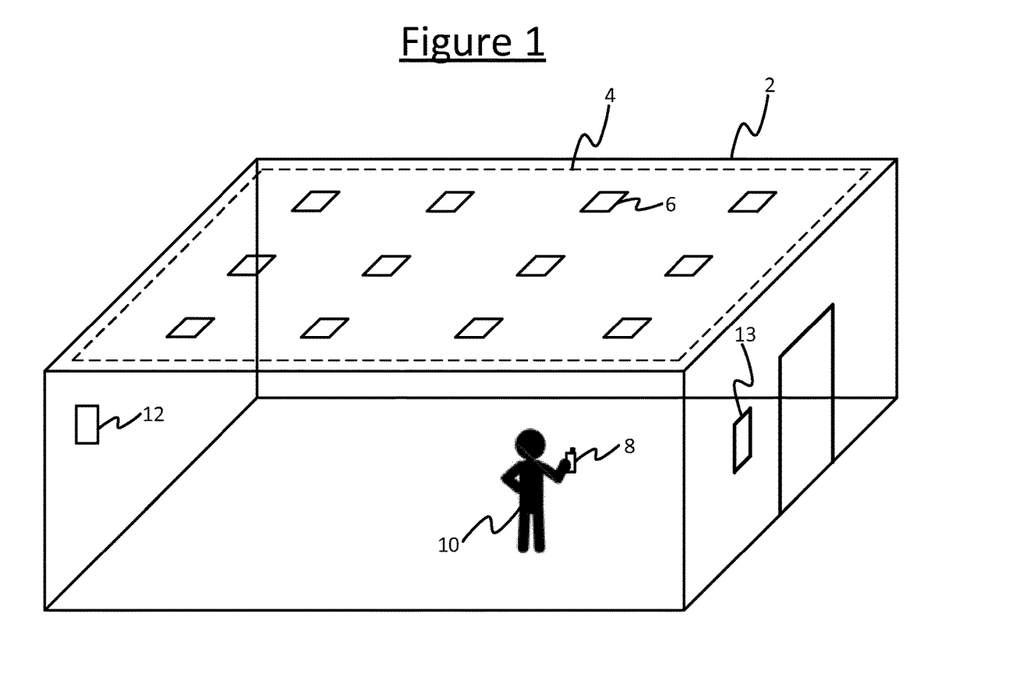
FIG. 1 is a schematic representation of an environment comprising a localization system in the form of an indoor positioning system.

FIG. 1 illustrates an example of a positioning system (localization system) installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positioning system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings. The following will be described in terms of the reference nodes 6 being anchor nodes of an indoor positioning system or the like, but it will be appreciated this is not necessarily the case in all possible embodiments.

The environment 2 is occupied by a user 10 having a wireless device 8 disposed about his or her person (e.g. carried by hand, or in a bag or pocket). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about a being or object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 10, being or object about which it is disposed.

Figure 2:
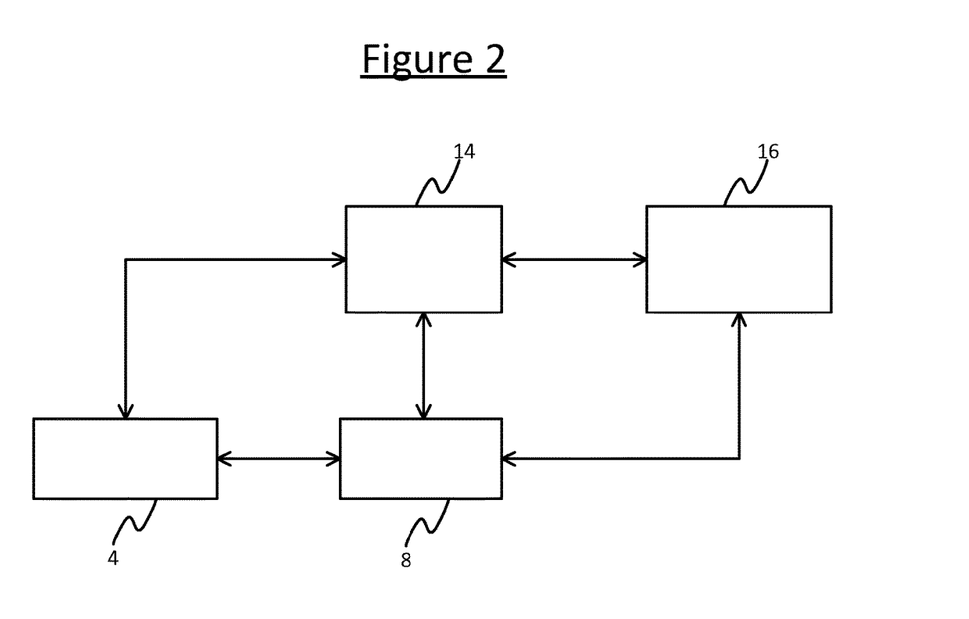
FIG. 2 is a schematic block diagram of a system for providing a location based service.

Referring to FIGS. 1 and 2, the environment 2 also comprises at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi, Zigbee or Bluetooth, using which each of the anchor nodes 6 is able to wirelessly communicate via the access point 12 and therefore with the location server 14. Alternatively it is not excluded that instead of using a wireless access point 12, each of the anchor nodes 6 could be provided with a wired connection to the location server 14, or one or more of the anchor nodes 6 could be arranged to act as an access point for the others. The following may be described in terms of a wireless connection via an access point 12 or the like, but it will be appreciated that this is not limiting to all possible embodiments.

The mobile device 8 is also able to communicate via the wireless access point 12 using the relevant radio access technology, e.g. Wi-Fi, Zigbee or Bluetooth, and thereby to communicate with the location server 14. Alternatively or additionally, the mobile device 8 may be configured to communicate with the location server 14 via other means such as a wireless cellular network such as a network operating in accordance with one or more 3 GPP standards. Further, the mobile device 8 is able to wirelessly receive beacon signals from, or transmit beacon signals to, any of the anchor nodes 6 that happen to be in range. In embodiments this communication may be implemented via the same radio access technology as used to communicate with the access point 12, e.g. Wi-Fi, Zigbee or Bluetooth, though that is not necessarily the case in all possible embodiments.

Generally any of the communications described in the following may be implemented using any of the above options or others for communicating between the respective entities 6, 8, 12, 14 and for conciseness the various possibilities will not necessarily be repeated each time.

The beacon signals between the anchor nodes 6 and the mobile device 8 are the signals whose measurements are used to determine the location of the mobile device 8. In a device-centric approach the anchor nodes 6 each broadcast a signal and the mobile device 8 listens, detecting one or more of those that are currently found in range and taking a respective signal measurement of each. Each anchor node 6 may be configured to broadcast its beacon signal repeatedly. The respective measurement taken of the respective beacon signal from each detected anchor node 6 may for example comprise a measurement of signal strength (e.g. RSSI), time of flight (ToF), angle of arrival (AoA), and/or any other property that varies with distance or location.

In a network-centric approach on the other hand, the mobile device 8 broadcasts a beacon signal and the anchor nodes 6 listen, detecting an instance of the signal at one or more of those nodes 6 that are currently in range. In this case the mobile device 8 may broadcast its beacon signal repeatedly. The respective measurement taken of each instance of the beacon signal from the mobile device 8 may comprise a measure of signal strength (e.g. RSSI) or time of flight (ToF), angle of arrival (AoA), and/or any other property that varies with distance or location. In an example of a hybrid approach, the nodes 6 may take the measurements but then send them to the mobile device 8, or the mobile device 8 may take the measurements but send them to the location server 14.

There are various options for the manner in which such measurements may be started and conducted. For example, either the mobile device 8 may initiate the transmission upon which the measurement is based, or the network may initiate the transmission. Both are possible, but it may have some impact how the rest of the process is implemented, in particular for time-of-flight measurements. Time-of-flight measurements can be obtained by establishing either a one way transmission delay or a two-way transmission delay (round trip time, RTT). A measurement of one-way delay can suffice if all relevant elements in the network have a synchronized clock or can reference a common clock. In this case the mobile device 8 may initiate the measurement with a single message transmission, adding a timestamp (e.g. time or time+date) of transmission to the message. If on the other hand the measurement is not based on a synchronized or common clock, the anchor or reference nodes 6 can still perform a measurement by bouncing individual messages back from the mobile device 8 and determining the round-trip time-of-flight. The latter may involve coordination from the nodes attempting to measure.

In the case of signal strength measurements, there are also different options for implementing these. The determination of distance from signal strength is based on the diminishment of the signal strength over space between source and destination, in this case between the mobile device 8 and anchor or reference node 6. This may for example be based on a comparison of the received signal strength with a-prior knowledge of the transmitted signal strength (i.e. if the nodes 6 or mobile device 8 are known or assumed to always transmit with a given strength), or with an indication of the transmitted signal strength embedded in the signal itself, or with the transmitted signal strength being communicated to the node 6 or device 8 taking the measurement via another channel (e.g. via location server 14).

Any one or a combination of these approaches or others may be applied in conjunction with the system disclosed herein. Whatever approach is chosen, once a beacon signal measurement is available from or at each of a plurality of the anchor nodes 6, it is then possible to determine the location of the mobile device 8 relative to the location network 4 using a technique such as trilateration, multilateration, triangulation and/or a fingerprint based technique.

In addition, the "absolute" locations of the anchor nodes 6 (or more generally reference nodes) are known, for example from a location database maintained by the location server 14, or by the respective location of each anchor node 6 being stored at the node itself (e.g. and communicated from each relevant nodes to the mobile device 8 in a device centric approach). The absolute location is a physical location of the node in a physical environment or framework, being known for example in terms of a geographic location such as the location on a globe or a map, or a location on a floorplan of a building or complex, or any real-world frame of reference.

By combining the relative location of the mobile device 8 with the known locations of the anchor nodes 6 used in the calculation, it is then possible to determine the "absolute" location of the mobile device 8. Again the absolute location is a physical location of the device in a physical environment or framework, for example a geographic location in terms of the location on a globe or a map, or a location on a floorplan of a building or complex, or any more meaningful real-world frame of reference having a wider meaning than simply knowing the location relative to the location network 4 alone.

In embodiments, the absolute location of the nodes 6 may be stored in a human understandable form and/or the absolute location of the mobile device 8 may be output in a human understandable form. For example, this may enable the user 10 to be provided with a meaningful indication of his or her location, and/or may enable the administrator of a location-based service to define rules for granting or prohibiting access to the service or aspects of the service. Alternatively it is possible for the location of the nodes 6 and/or mobile device 8 to only ever be expressed in computer-readable form, e.g. to be used internally within the logic of the location based service.

In other embodiments it is not excluded that the location is only ever expressed relative to the location network 4, 6 and not as a more meaningful "absolute" location. For example if each anchor node 6 is integrated with a respective luminaire (see below) and the location is being determined for the purpose of controlling those luminaires, then in some embodiments it may only be necessary to determine the user's location relative to the framework of points defined by the anchor nodes of these luminaires (though in other similar arrangements it may still be desired to define lighting control regions relative to the floorplan of a building or the like).

In a device-centric approach, the beacon signal from each anchor node 6 comprises an ID of the respective anchor node. The mobile device 8 then uses these IDs to look up the locations of the relevant nodes 6 by querying the location server 14 (e.g. via the wireless access point 12). Alternatively the beacon signal from each node 6 could even comprise an explicit indication of the respective location. Either way, the mobile device 8 can then perform the calculation to determine its own location at the device 8 itself (relative to the location network 4 and/or in absolute terms). In a network-centric approach on the other hand, the beacon signal comprise an ID of the mobile device 8, and the anchor nodes 6 submit the beacon signal measurements they took to the location server 14 along with the mobile device's ID (e.g. via the wireless access point 12). The location server 14 then performs the calculation of the device's location at the server 14 (again relative to the location network 4 and/or in absolute terms). In an example of a hybrid approach, the mobile device 8 may take the measurements of the beacon signals from the nodes 6, but submit them along with the respective received IDs to the location server 14 in a raw or partially processed form for the calculation to be performed or completed there.

Typically a beacon signal measurement is needed from at least three reference nodes, though if other information is taken into account then it is sometimes possible to eliminate impossible or unlikely solutions based on two nodes. For example, if the location is assumed to be constrained to a single level (e.g. ground level or a given floor of a building), the measurement from any one given node 6 defines a circle of points at which the mobile device 8 could be located. Two nodes give two circles, the intersection of which gives two possible points at which the mobile device 8 may be located. Three nodes and three circles are enough to give an unambiguous solution at the intersection of the three circles (though more may be used to improve accuracy). However, with only two nodes, sometimes it may be possible to discount one of those points as being an unlikely or impossible solution, e.g. being a point in an area to which the user 10 does not have access or it is impossible to reach, or a point that is not consistent with a plotted trajectory (path) of the user 10 (elimination by "dead reckoning"). Similar comments may be made in relation to three-dimensional positioning: strictly four nodes defining four spheres are required to obtain an unambiguous solution, but sometimes an estimate may be made based on fewer nodes if additional information can be invoked. Assuming the user 10 is constrained to a particular level to constrain to a two-dimensional problem is an example of such information. As another example, it may be assumed the user 10 is found on one of a plurality of discrete floors, and/or a dead reckoning type approach may be used to eliminate unlikely jumps in the user's route.

By whatever technique the location is determined, this location may then be used to assess whether the mobile device 8 is granted access to some location-based service or other such function. To this end, there is provided a service access system 16 configured to conditionally grant access to the service in dependence on the absolute location of the mobile device 8. In a device centric approach the mobile device 8 submits its determined absolute location (e.g. in terms of global coordinates, map coordinates or coordinates on a floor plan) to the service access system 16 over a connection via the wireless access point 12 or other means such as a cellular connection. The service access system 16 then assesses this location and grants the mobile device 8 with access to the service on condition that the location is consistent with provision of the service (and any other access rules that happens to be implemented, e.g. also verifying the identity of the user 10). In a network centric approach, the location server 14 submits the determined absolute location of the mobile device 8 to the service access system 16, e.g. via a connection over a local wired or wireless network and/or over a wide area network or internetwork such as the Internet. Alternatively the location server 14 may send the absolute location to the mobile device 8, and the mobile device may then forward it on to the service access system 16. In another alternative the service could be provided directly from the location server 14, or could even be implemented on an application running on the mobile device 8 itself.

The following are some examples of location-related services or functions that may be provided in accordance with embodiments of the present disclosure:

allowing control of a utility such as lighting from an application running on the mobile device 8, where the user can only control the lighting or utility in a given room or zone when found to be located in that room or zone, or perhaps an associated zone;

providing a navigation service such as an indoor navigation service to the mobile device 8 (in which case the location-related function comprises at least providing the device's absolute location to an application running on the mobile device 8, e.g. which the application may then use to display the user's location on a floor plan or map);

providing location based advertising, alerts or other information to the mobile device 8, e.g. providing the device 8 with information on exhibits as the user 10 walks about a museum, providing the device 8 with information about products as the user 10 walks about a shop or mall, providing the device 8 with access to medical data only if present inside a hospital or specific zone within a hospital, or providing the device 8 with access to complementary media material only if present physically within a movie theatre or the like; and/or accepting location dependent payments from the mobile device on condition that the device 8 is present in a certain region, e.g. payments in shops, payment of road tolls, "pay as you drive" car rental, or entrance fees to venues or attractions.

With regard to security, provided that the localization messages are distributed internally within the localization system 4, 6, 14 security may be less of an issue; but in the case of two-way time of flight messages (RTT) for example, or where the reports are transmitted over a public network, it may be advantageous to provide them with a time-stamp (measurement time) or a nonce, and/or to "hash" the messages (digital signature) so as to thwart any replay attacks on the network backbone. The same could be done with the measurement reports sent to the location server 14. Such measures are not essential but may be desirable in embodiments, particularly if the location-based service or functionality is susceptible to abuse or involves financial transactions or the like.

Note that FIG. 2 shows arrows in all directions to illustrate the possibility of either device centric or network centric approaches, but in any given implementation not all the communications shown need be bidirectional or indeed present at all.

According to embodiments of the present disclosure, each of the anchor nodes 6 does not take the form of a dedicated, stand-alone anchor node, but rather a unit of another utility that is present in the environment 2 for another purpose, and which is exploited in order to incorporate the additional functionality of an anchor node. In one particularly preferred implementation, each of the anchor nodes 6 is incorporated into a respective "smart luminaire" having an RF transceiver such as a Wi-Fi, ZigBee or Bluetooth transceiver for facilitating wireless control of the lighting in the environment 2 (as discussed in more detail later), and the anchor node functionality is incorporated by exploiting the existence of this RF transceiver to additionally broadcast and/or receive localization beacon signals for an additional purpose of locating a mobile device 8. The luminaires 6 may for example be installed in the ceiling and/or walls, and/or may comprise one or more free standing units.

The following will be described in terms of each of the anchor nodes 6 being incorporated into respective luminaires 6, but it will be appreciated that this is not limiting to all possible embodiments. E.g. in alternative arrangements, each of the anchor nodes 6 may be incorporated into any of a luminaire, a smoke alarm, a presence sensor and/or light sensor unit, a security alarm, an air-conditioning unit, a ventilation unit, or a heating unit (and each anchor node 6 does not necessarily have to be incorporated into the same type of unit, though they may be).

The system further comprises a centralized or master controller comprising one or more control units 13, separate from the luminaires 6, for controlling the light output of the luminaires 6. For example the control unit(s) 13 may take the form of a central server comprising one or more servers at one or more sites, and/or a one or more wall panels. The following will be described in terms of a central control unit, but it will be understood that in some alternative embodiments the central controller 13 could in fact take the form of more than one physical units working together to provide the centralized control functionality. In this case the control is described as "centralized" at least in that there is a separate control entity 13, external to the luminaires 6 and controlling them wirelessly, rather than the luminaires 6 each acting autonomously in a distributed fashion.

To allow the control unit 13 to control the luminaires 6, the luminaires 6 are arranged to communicate wirelessly with the control unit 13. Preferably this communication is achieved using the same transceiver and same radio access technology that the anchor nodes 6 and mobile device 8 use to communicate beacon signals between them. In embodiments, the wireless communication between the control unit 13 and anchor nodes 6 may also be performed via the same wireless access point 12 that the anchor nodes 6 and/or mobile device 8 use to communicate with the wireless access point 12 and thereby access the location server 14 and/or application server 16, e.g. using Wi-Fi. Alternatively the lighting control unit 13 may be arranged to communicate with the light sources directly, not requiring an access point 12, e.g. using ZigBee.

The wireless communication between the control unit 13 and one or more of the luminaires 6 may comprise the wireless transmission of lighting control commands from the control unit 13 to the luminaires 6, controlling them to adjust their respective light output, e.g. to turn their light on or off, to dim up or down, to change color, or to set a certain dynamic lighting effect. Alternatively or additionally, the wireless communication between the control unit 13 and one or more of the luminaires 6 may comprise the wireless transmission of sensor data from the luminaire 6 to the control unit 13, e.g. from a presence sensor or an ambient light sensor on each luminaire 6; and/or may comprise the wireless transmission of status reports from the luminaire 6 to the control unit 13, e.g. to report a fault, a number of burning hours to date, a current operating temperature, etc.

In embodiments the service access system 16 may be configured to control access to the control of the lighting 6. In this case, the access system 16 of the lighting controller is configured with one or more location dependent control policies. For example, a control policy may define that a user 10 can only use his or her mobile device 8 to control the lights in certain region such as a room only when found within that region or within a certain defined nearby region. As another example control policy, the mobile device 8 only controls those luminaires within a certain vicinity of the user's current location. However, note that this is only one example of a location-based service that may be provided based on the anchor nodes incorporated into the luminaires 6. In other examples, the control of the lighting could be unrelated to the localization in terms of its user-facing function, and instead the location-based service could be something else such as an indoor navigation service, location-based advertising, etc.

Figure 3:
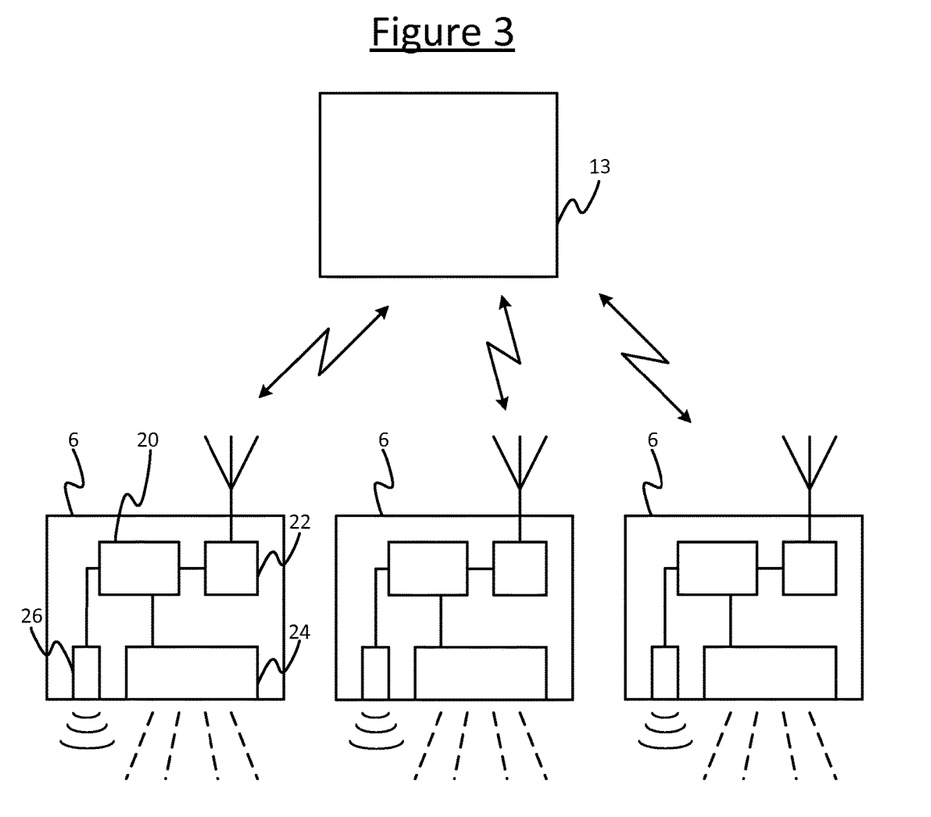
FIG. 3 is a schematic block diagram of a localization system.

FIG. 3 illustrates the combined lighting and localization system in more detail. As shown, each luminaire 6 comprises: a local controller 20, a wireless interface 22 comprising a transmitter and/or receiver and preferably both (a transceiver), a lamp (lighting element) 24, and optionally one or more sensors 26. Each of the transceiver 22, lamp 24 and one or more sensors 26 is connected to the local controller 20. The local controller 20 is arranged to use the transceiver 22 to communicate wirelessly with the central control unit 13. The local controller 20 may take the form of software stored on one or more memories of the luminaire 6 and arranged to run on one or more processors of the luminaire 6, or may be implemented in dedicated hardware circuitry, configurable or reconfigurable circuitry (e.g. a PGA or FPGA), or any combination of these. Somewhat similarly, the central control unit 13 may be implemented in software stored and run on a central computer system, or in dedicated hardware circuitry, configurable or reconfigurable circuitry, or any combination of these. E.g. the central control unit 13 may be implemented in software and/or hardware at a dedicated control unit such as a wall-panel or lighting bridge in the environment 2, or a local or remote server at one or more sites, or a combination of these.

The luminaire's local controller 20 is arranged to wirelessly receive control commands from the central control unit 13 via the transceiver 22, and to control the light output of the lamp 24 (via a driver, not shown) in accordance with the commands, e.g. to turn the light on or off, dim the light level up or down, change its color, or apply a dynamic effect, etc. The luminaire's local controller 20 may also be configured to use the transceiver 22 to wirelessly transmit status reports to the central control unit 13, e.g. to report a fault, burning hours, operating temperature, etc.

Further, in embodiments the luminaire's local controller 20 is configured to use the transceiver 22 to wirelessly transmit sensor data to the central control unit 13, taken based on the luminaire's respective sensor or sensors 26. In embodiments, the sensor(s) 26 may comprise a presence sensor (e.g. occupancy sensor) arranged to detect the presence of a living being such as a human in the environment 2, or a certain defined region of the environment 2. For example, the presence sensor 26 may comprise an active ultrasound sensor arranged to detect movement of an object and/or distance of an object from the sensor based on emitting ultrasound pulses and detecting echoes of the pulses back at the sensor 26, or the presence sensor 26 may comprise a passive infrared sensor configured to detect infrared emissions from a living being, or the presence sensor 26 may even comprise a 2D or depth-aware camera plus image recognition algorithm. Various other types of presence sensor will in themselves be known to a person skilled in the art. Alternatively or additionally, the sensor(s) 26 may comprise a light level sensor such as a daylight sensor or other ambient light sensor. Whatever types of sensor(s) 26 are incorporated in the luminaire 26, the local controller 20 of the luminaire is configured to take the data from at least one of the one or more sensors 26 and to use the transceiver 22 to report the sensor data.

These various control-related communications between luminaires 6 and central control unit 13, such as control commands, status reports and/or sensor data, may be communicated by any of the wireless communication means discussed above or others. By whatever means implemented, the same transceiver 22, or at least the same wireless access technology or frequency band, is exploited to also broadcast and/or receive the localization beacon signals to/from the mobile device 8. As mentioned, this creates a potential interference between the control commands and the beacon signals.

There is a trend toward providing greater connectivity and intelligence in lighting systems. In particular, lighting systems wherein luminaires 6, sensors 26 and controllers 13, 20 are inter-connected by wireless communication are increasingly popular. Such wireless lighting systems can be easy to deploy (require minimal wiring) and to control. Lighting systems, given the dense deployment of luminaires 6 and power units, are an attractive platform for offering value services. Specifically, as described, wireless radios 22 may be hosted in luminaires to offer indoor positioning and location-based services. E.g. zone-based positioning with such a dense deployment of radios can potentially provide better accuracy and reliability in comparison with other traditional radio positioning approaches.

However, when such a system is deployed with a wireless radio (e.g. ZigBee) being used for lighting control and a wireless radio, either the same or different (e.g. Bluetooth), being used for indoor positioning, there will be harmful interference from one system to another. This may result in lost lighting control messages slowing the dimming behavior of the lighting system, e.g. making it less responsive to changing occupancy and daylight.

According to embodiments of the present disclosure, there is provided an interference-aware radio beaconing system for indoor positioning in order to co-exist with the wireless lighting control system.

To achieve this, the wireless control-related signals (e.g. sensor data) and the wireless beaconing signals are arranged so that the wireless radio transmissions follow an interference-aware beaconing schedule, whereby the beacon signals are scheduled in a time-multiplexed fashion between sensor data transmissions and/or other control-related transmissions. In embodiments, the interference-aware radio beaconing schedule is determined by the schedule of occupancy and/or light sensor transmissions. For example, the timing of the interference-aware radio beaconing may be determined by event-triggered occupancy and/or light sensor transmissions, so as to be time-multiplexed between the sensor data transmissions.

For instance, consider the case where an occupancy and/or light sensor 26 is disposed at each luminaire 6. Sensor data from multiple such sensors 26 may be used by the central control unit 13 to select the dimming levels of the luminaires 6 (and/or other parameters of the light output, e.g. color). A wireless radio 22 at each luminaire 6 is used to communicate sensor data from the sensors 26 to the control unit 13, and to communicate lighting control commands from the central control unit 13 to the luminaires 6 to set the respective light output (e.g. dimming level and/or color). The same wireless radio 22 may also be used for sensing or broadcasting beacons for indoor positioning.

In embodiments, the occupancy and/or light sensors 26 are event-triggered. That is, the luminaire's local controller 20 transmits data from its respective sensor or sensors 26 only when an event occurs at the relevant sensor, e.g. only when the sensor reading exceeds a threshold or the local controller 20 in some other way detects a positive detection based on the sensor reading (e.g. detects a certain signature based on the sensor reading). For example in the case of the occupancy sensor, this local controller 20 sends the occupancy sensor data only when there is a change in occupancy status; and in the case of the light sensor, the local controller 20 only sends the data when a sufficient change in ambient light level is sensed. Note: the sensor data as sent to the central control unit 13 does not necessarily comprise a raw or even quantitative measure of the sensor's immediate output: rather, the data as transmitted could comprise any sensor data giving any information based on the sensed reading. E.g. it could be anything from a full measurement, to a quantized measurement, or even just a plain indication that the sensor event in question was detected to have occurred (e.g. just indicating the fact that the sensor output exceeded a threshold, or that the occupancy status was detected to have changed, or that a certain other signature was detected).

Figure 4:
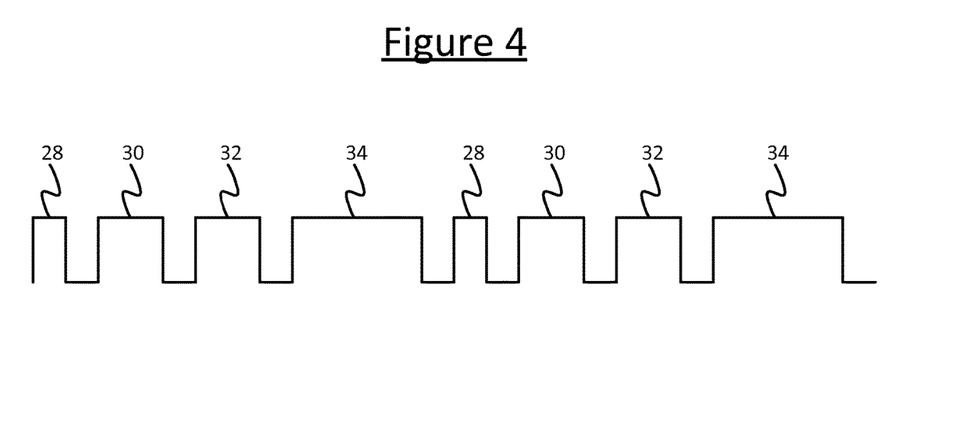
FIG. 4 is a schematic timing diagram illustrating a scheme for scheduling messages in a localization system.

An example scheduling scheme in accordance with a first embodiment of the present disclosure is illustrated in FIG. 4. In a first time slot 28, the central control unit 13 polls all the luminaires 6 to ask them to report values from their respective sensors 26. In response, in a second, subsequent time slot 30, the luminaires 6 report values if there is an event change based on their respective sensors 26 (e.g. as discussed earlier). In case there is no event change to report from the sensor(s) 26 of a given luminaire 6, that luminaire may instead transmit a localization beacon in this time slot 30. After the sensor reporting is done, there is a third time slot 32, subsequent to the first and second, in which the central control unit 13 sends the computed dim values (or other such lighting control commands) to the luminaires 6. This may be followed by a fourth time slot 34, which is a dedicated slot for location beaconing. In some embodiments, the location beaconing slot 34 may be interrupted by any sensor event, when there is an event change such as an occupancy or illuminance change that needs to be reported back to the control unit.

In this first embodiment, the central control unit 13 is coordinating the control and beaconing transmissions: the polling by the control unit 13 defines the first time slot 28 and triggers the transmissions in each of the subsequent second to fourth time slots 34. In embodiments, the polling by the central control unit 13 may be performed periodically, such that the schedule cycles through a repeating pattern of time slots 28-34. Alternatively, the polling 28 by the central control unit may be triggered by a sensor message form one of the luminaires 6 (when an event change happens).

In a second, alternative embodiment, the luminaires 6 report their sensor values to the central control unit 13 in one of the following modes: unicast, multicast or broadcast, depending on the acceptable latency and reliability required for lighting control. Again, based on the sensor values, the control unit 13 determines the dim levels of the luminaires 13 (or such like). Once the central control unit 13 has sent a dim value to a particular luminaire 6, the corresponding wireless radio 22 is permitted to transmit a location beacon after ensuring that the channel is free of lighting control transmissions. That is, once a particular luminaire 6 has received a dim value from the central control unit 13, in response the local controller 20 of the luminaire 6 tests the medium for other control-related signals, and if none is heard, it emits a beacon signal. In this second embodiment, each luminaire 6 knows a potential slot in which it can send a localization beacon signal after ensuring that the channel medium is free. Therefore embodiments of this kind can operate without synchronization between all the luminaires 6. Note that in embodiments, beacons may be allowed to collide with other beacons, while a beacon should not collide with a lighting control message.

It will be appreciated that the above embodiments have been described only by way of example.

The scope of the disclosure is not limited to any particular specific scheduling scheme. The principle behind the disclosure can be realized by any scheme whereby the control-related signals are communicated in different slots than the location beaconing signals, whether the beaconing is triggered by a central controller, or the luminaires 6 are synchronized to common time base, or synchronized to one another; and whether the beaconing is performed in some of the sensor data slots or other control time slots when there are no sensor data or control-related signals to report, or in dedicated time slots reserved for beaconing.

Further, the system does not necessarily require a central control unit 13. In alternative implementations, the control functionality could be implemented in a distributed fashion, with each of the luminaires 6 exchanging their sensor data with one another and controlling their own light output (e.g. dimming levels) based on this.

As another example, the lighting system may comprise one or more separate sensor units (not shown) external to and remote from the luminaires 6, e.g. one or more presence sensor units and/or one or more ambient light sensor units. In this case the sensors wirelessly report their sensor data to the central control unit 13 (in a non-distributed approach) or to the individual luminaires 6 (in a distributed approach), in order for the control unit 13 or luminaires 6 to select the appropriate dim levels. In such embodiments, the scheduling of the sensor data and beaconing may be arranged to avoid that the luminaire 6 transmits or listens for a location beacon in the same time slot as it listens for a beacon signal, or in the same time slot that it knows the control unit 13 will be listening for a beacon signal.

Note also that the system does not necessarily have to include any sensors 26, or not all of them do. The teachings of the present disclosure can also apply to avoiding collision between beacon signals and other types of control-related signals, such as dimming commands or other control commands, which may for example be based on user selected settings rather than sensor data.

Further, the anchor node functionality does not necessarily have to be incorporated into every one of the luminaires. In alternative embodiments, each of the nodes 6 of the localization system may correspond to a respective group of luminaires.

Furthermore, the anchor node functionality does not necessarily have to be incorporated into luminaires. In embodiments, each anchor node 6 may comprise an appliance providing any kind of utility into the environment 2, such as: a smoke alarm (in which case the utility comprises detecting smoke in the environment 2 and alerting users), a presence sensor unit (in which case the utility comprises detecting presence of users, i.e. occupancy, in the environment 2), a light sensor unit such as a daylight or other ambient light sensor (in which case the utility comprises sensing light level in the environment 2), a security alarm (in which case the utility comprises sensing intrusion into the environment and alerting users), an air-conditioning unit (in which case the utility comprises regulating the temperature and/or humidity of the air in the environment 2), a ventilation unit (in which case the utility comprises ventilating the environment 2), or a heating unit (in which case the utility comprises heating the environment 2). Any combination of these with one or more luminaires and/or other types of node is also possible. In such cases, the control-related signals may be any kind of signals related to the control of the utility in question. Also, note that some nodes 6 may comprise sensors other than a presence of occupancy sensor, e.g. a temperature sensor, and the sensor data being transmitted may comprise data based on such sensors.

In yet further embodiments the reference nodes 6 need not necessarily be installed at fixed locations or be nodes of an indoor positioning system, as long as their locations can still be known. E.g. consider a portable node: if this is placed down by a user, and then itself located by the positioning system, its location may become known to the location server 14 and thus become a known reference point that cab be used for localizing the mobile device 8.

Further, note that in all possible embodiments, the beacon signals do not necessarily have to be communicated using the same wireless interface 22 or even on the exact same frequency band as the control-related signals. Interference can still occur whether these are communicated using the same or a different wireless interface, as long as the frequency is the same or overlaps to any substantial extent (on the same carrier medium). Note also that the scope of the present disclosure is not limited to radio as the carrier medium: similar issues can still apply if the control-related signals and beacon signals are transmitted on other carrier media, e.g. coded light, ultrasound or infrared.

Figure 5:
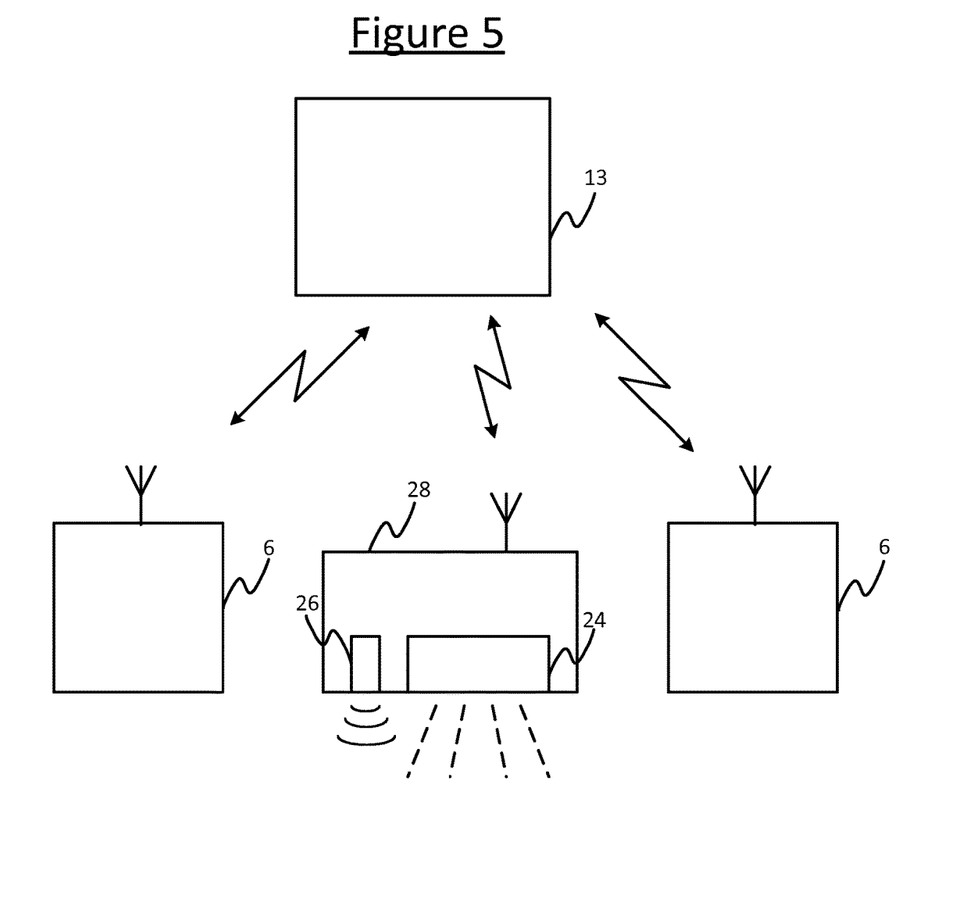
FIG. 5 is a schematic block diagram of another localization system.

Furthermore, as shown in FIG. 5, the luminaires (or utility) need not necessarily be integrated into the same units or be co-located with the anchor nodes 6, and in alternative embodiments could be implemented in one or more completely separate, non-co-located physical units 28 than the anchor nodes 6. In this case, the scheduling can be coordinated by a centralized controller 13 that emits a synchronizing signal to synchronize the time-bases of the luminaires and anchors, or which triggers each of the beacons and control events individually (with the luminaires and anchors being slaves to the central controller).

For example, the appliance implemented in each of the separate unit(s) 28 may comprise a lamp 24 (e.g. the unit 28 is a dedicated luminaire), or a sensor (e.g. the unit 28 is a dedicated sensor unit), or a combination of these (the unit 28 is a luminaire with integrated sensors). In such cases, the first embodiment as described above would still work, with the provision that the control unit 13 signals to the anchor nodes 6 that they may transmit a localization (beacon) signal. Or applying a technique similar to the second embodiment to this scenario, the sensors 26 in the separate units 28 may still contend for the channel with the anchor nodes 6 (e.g. using CSMA, carrier sense multiple access). This would still work, but might lead to additional latency in case the number of anchor nodes 6 is large. One option would be to include a contention mechanism whereby sensor nodes 28 have a smaller back-off window in comparison to anchor nodes 6. According to a CSMA protocol, when a collision occurs, a node backs off for a certain period and then attempts to access the medium again after waiting for the backed off time. For a distributed system, in particular, a mechanism to ensure that two nodes 6, 28 that collided do not collide again (with high probability) is to configure them to use different back-off durations. In embodiments the sensor nodes 28 may be configured with a shorter back-off duration than the anchor nodes 6. This way, the sensors nodes 28 will have a higher probability to find the channel empty in comparison to the anchor nodes 6. Upon successful reception of a sensor message, the central controller 13 could still then control transmissions from the anchor nodes 6.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A localization system for detecting a location of a mobile device within an environment, the localization system comprising:
    a plurality of wireless reference nodes, wherein each of the wireless reference nodes comprises a wireless interface arranged for transmission of localization beacon signals between the wireless interface and the mobile device, wherein one or more wireless reference nodes, of said plurality of wireless reference nodes, further comprises a respective sensor;
    one or more appliances arranged to provide or contribute to providing another utility into the environment, other than localization of mobile devices;
    one or more controllers arranged to control said one or more appliances, and to use a wireless interface of each of the appliances to transmit and/or listen for a plurality of control-related signals, other than the localization beacon signals, related to controlling the provision of said utility, the control-related signals being communicated on a same or overlapping frequency band as the localization beacon signals;
    wherein at least some of the control-related signals comprise sensor data transmitted from at least one of said one or more wireless reference nodes, taken using the respective sensor;
    wherein the plurality of wireless reference nodes are configured to time-multiplex transmission of and/or listening for the localization beacon signals and transmission of and/or listening for said plurality of control-related signals into different time slots;
    wherein the at least one of said one or more wireless reference nodes is further configured to detect one or more sensing events based on activity sensed using the respective sensor, transmit the sensor data in an allocated one of said time slots on condition that one of the sensing events is detected, and transmit one of the localization beacon signals in said allocated time slot on condition that none of the sensing events is detected.

2. The localization system of claim 1, wherein one of said one or more appliances is co-located with each of one, some or all of the plurality of wireless reference nodes.

3. The localization system of claim 2, wherein the appliance at each of one, some or all of the plurality of wireless reference nodes comprises one of: a lamp, a smoke alarm, a presence sensor unit, a light sensor unit, a security alarm, an air-conditioning unit, a ventilation unit, or a heating unit.

4. The localization system of claim 2, wherein each of one, some or all of the plurality of wireless reference nodes comprises a luminaire or group of luminaires, said one of said appliance comprising a lamp or group of lamps, said utility comprising illumination for illuminating the environment.

5. The localization system of claim 1, comprising a location server configured to compute the location of the mobile device using measurements of at least some of said localization beacon signals reported to the location server.

6. The localization system of claim 5, wherein the measurements are reported to the localization server from the plurality of wireless reference nodes or from the mobile device.

7. The localization system of claim 1, comprising an application server configured to provide the mobile device with a location-based service based on the location of the mobile device as computed using at least some of the localization beacon signals.

8. The localization system of claim 7, wherein said computation of the location of the mobile device is performed at a location server or the mobile device, and reported to the application server in order for the location-based service to be provided based on said location.

9. The localization system of claim 1, wherein said one or more controllers comprise a centralized control unit of the utility, and at least some of said plurality of control-related signals comprise control commands from the centralized controller.

10. The localization system of claim 1, wherein the respective sensor of said at least one of said one or more wireless reference nodes comprises a presence sensor or a daylight sensor.

11. The localization system of claim 2, wherein a respective controller of the one or more controllers is located at each of the plurality of wireless reference nodes, and wherein the at least some of the control-related signals are listened for by the respective controller.

12. The localization system of claim 1, wherein functionality of said one or more appliances Is incorporated into each of said one or more wireless reference nodes.

13. A computer program product for use in a localization system comprising a plurality of wireless reference nodes for detecting a location of a mobile device within an environment, the computer program product comprising code embodied on a non-transitory computer-readable medium and configured, when run on one or more controllers, to perform operations of:
    controlling a wireless interface of each of the wireless reference nodes such that localization beacon signals are transmitted between the wireless interface and the mobile device;

controlling a respective sensor of one or more wireless reference nodes of said plurality of wireless reference nodes;

controlling one or more appliances to provide or contribute to providing another utility into the environment, other than localization of mobile devices;

controlling a wireless interface of the one or more appliances to transmit and/or listen for control-related signals, other than the localization beacon signals, related to controlling the provision of said utility, the control-related signals being communicated on a same or overlapping frequency band as the localization beacon signals, wherein the control-related signals comprise sensor data transmitted from at least one of said one or more wireless reference nodes, taken using the respective sensor;

wherein the code is configured to time-multiplex transmission of and/or listening for the localization beacon signals and transmission of and/or listening for said control-related signals into different time slots; and wherein the code is configured to detect one or more sensing events based on activity sensed using the respective sensor, transmit the sensor data in an allocated one of said time slots on condition that one of the sensing events is detected, and transmit one of the localization beacon signals in said allocated time slot on condition that none of the sensing events is detected.

14. The computer program product of claim 13, wherein functionality of said one or more appliances is incorporated into each of said one or more wireless reference nodes.

15. A method of operating a localization system comprising a plurality of wireless reference nodes for detecting a location of a mobile device within an environment, the method comprising:

controlling a wireless interface of each of the wireless reference nodes such that localization beacon signals are transmitted between the wireless interface and the mobile device;

controlling one or more wireless reference nodes, of said plurality of wireless reference nodes, comprising a respective sensor;

controlling one or more appliances to provide or contribute to providing another utility into the environment, other than localization of mobile devices;

controlling a wireless interface of each of the appliances to transmit and/or listen for control-related signals, other than the localization beacon signals, related to controlling the provision of said utility, the control-related signals being communicated on a same or overlapping frequency band as the localization beacon signals, wherein at least some of the control-related signals ta-comprise sensor data transmitted from at least one of said one or more wireless reference nodes, taken using the respective sensor;

wherein said controlling of the wireless interface comprises time-multiplexing transmission of and/or listening for the localization beacon signals and transmission of and/or listening for said control-related signals into different time slots; and detecting one or more sensing events based on activity sensed using the respective sensor, transmitting the sensor data in an allocated one of said time slots on condition that one of the sensing events is detected, and transmitting one of the localization beacon signals in said allocated time slot on condition that none of the sensing events is detected.

16. The method of claim 15, wherein functionality of said one or more appliances is incorporated into each of said one or more wireless reference nodes.

* * * * *